United States Patent [19]

Cousin et al.

[11] Patent Number: 4,692,862
[45] Date of Patent: Sep. 8, 1987

[54] RAPID MESSAGE TRANSMISSION SYSTEM BETWEEN COMPUTERS AND METHOD

[75] Inventors: Daniel Cousin, Asnieres; Jean-Francois Garnier, Rueil-Malmaison; Jean-Pierre Georges, Sevres, all of France

[73] Assignee: Jeumont-Schneider Corporation, France

[21] Appl. No.: 807,697

[22] Filed: Dec. 11, 1985

Related U.S. Application Data

[63] Continuation-in-part of Ser. No. 726,944, Apr. 26, 1985, abandoned, which is a continuation of Ser. No. 324,387, Nov. 10, 1981, abandoned.

[30] Foreign Application Priority Data

Mar. 6, 1981 [FR] France ............................... 8005287

[51] Int. Cl.$^4$ ............................................. G06F 13/38
[52] U.S. Cl. .................................................... 364/200
[58] Field of Search ......................................... 364/200

[56] References Cited

U.S. PATENT DOCUMENTS

| | | | |
|---|---|---|---|
| 3,810,114 | 5/1974 | Yamada et al. | 364/200 |
| 3,984,819 | 10/1976 | Anderson | 364/200 |
| 4,096,571 | 6/1978 | Vander Mey | 364/200 |
| 4,219,873 | 8/1980 | Kober et al. | 364/200 |

OTHER PUBLICATIONS

Hirschman et al., "Standard Modules Offer Flexible Multiprocessor System Design", Computer Design, May 1979, pp. 181–189.

Primary Examiner—Thomas M. Heckler
Attorney, Agent, or Firm—Rines and Rines

[57] ABSTRACT

In a computer network having a central computer, a plurality of peripheral computers, and a time-shared common memory accessible to the network computers over a single bus connected to the common memory, an electronic switch of the telephone type is connected to all of the computers so that direct links may be established between respective members of one or more selected pairs of computers. Data is transmitted between computers via the direct links effected by the switch, and the bus is thus primarily reserved for access to the main memory for each of the computers. Direct links for transmitting data from a peripheral computer and another computer are established in accordance with connection orders sent from the peripheral computer to the central computer via the common memory. If the other computer is available to receive data, the central computer instructs the electronic switch to connect the peripheral computer directly to the receiving computer.

5 Claims, 2 Drawing Figures

RAPID MESSAGE TRANSMISSION SYSTEM BETWEEN COMPUTERS AND METHOD

CROSS REFERENCES TO RELATED APPLICATIONS

This application is a continuation-in-part of U.S. patent application Ser. No. 726,944 filed Apr. 26, 1985, now abandoned, which is a continuation of U.S. patent application Ser. No. 324,387 filed Nov. 10, 1981, now abandoned.

BACKGROUND OF THE INVENTION

The present invention pertains to a rapid message transmission system for computer networks of the type including a central (or control) computer and a plurality of peripheral computers all connected to a single data bus, with a main or common memory also being connected to the same bus.

In networks of this type, each peripheral computer possesses a separate memory so that most operations can be completed on a local basis. The central computer, which has its own local memory, supervises and controls the integrated operation of the network computers, including the transmission of data between computers. One known technique for transmitting data from one computer to another involves a writing cycle over the bus to the main memory, executed by a transmitting computer, followed by a reading cycle over the bus from the main memory, executed by a receiving computer. In order to prevent scrambling of data which is being transmitted along the bus, a timesharing component, associated with the central computer, is provided to regulate access of the network computers to the main memory.

With expansion of local memory capacities in such networks, messages transferred by means of the bus become increasingly longer. As a result, a traffic overload develops within the bus, and it becomes difficult for the network computers to gain access to the main memory.

SUMMARY OF THE INVENTION

The object of the present invention is to eliminate use of the bus during transmission of messages between computers in networks of the type just described, so as to reduce overloading of the bus and reduce required message transmission time.

A further object of the invention is to provide a novel method and system for transmission of messages between computers that obviate the earlier mentioned problems and provide a significant gain in speed.

Other and further objects will be later explained and more fully delineated in the appended claims.

In summary, according to the present invention, individual computers in a network of the previously described type are connected to an electronic switch which is controlled by the main computer through the network data bus. The electronic switch establishes direct links between pairs of computers in accordance with connection orders processed by the central computer, with connection orders issued by the peripheral computers being transmitted to the central computer via the time-shared main memory. Thus, by virtue of the invention, data may be transmitted directly between computers through the switch rather than through the main memory, with the bus being reserved for transmittal of connection orders or other information which must be sent through the main memory.

More particularly stated, in one of its broader aspects, the invention provides a computer network including a central computer, a plurality of peripheral computers, a common memory accessible by the central and peripheral computers over a single bus connected to the common memory, time-sharing means connected to the central computer and the peripheral computers for regulating access to the common memory by the central and peripheral computers, and electronic switch means having switchable connections to the respective central and peripheral computers and having control means connected to the bus for receiving control signals from the central computer, whereby direct connections between respective members of one or more selected pairs of computers may be effected through the electronic switch so that the respective members of each of the pairs of computers may communicate directly through the switch.

In another of its broad aspects, the invention relates to a method of transmitting information between computers in a network as just described, the method comprising granting access of a first computer to the common memory, writing a connection order from that computer to the common memory, the connection order identifying that computer and a second computer to which the information is to be transmitted, reading the connection order from the common memory to the central computer, and issuing a control signal from the central computer to the electronic switch over the bus for causing the switch to connect the first computer to the second computer, whereby the information may be transmitted directly from the first computer to the second computer through the switch.

The present invention can be more fully understood, and additional objects, advantages, and characteristics can be recognized in a clearer form by the following description of a preferred application of the invention with reference to the accompanying drawings.

DESCRIPTION OF THE PREFERRED EMBODIMENT

Figure 1:
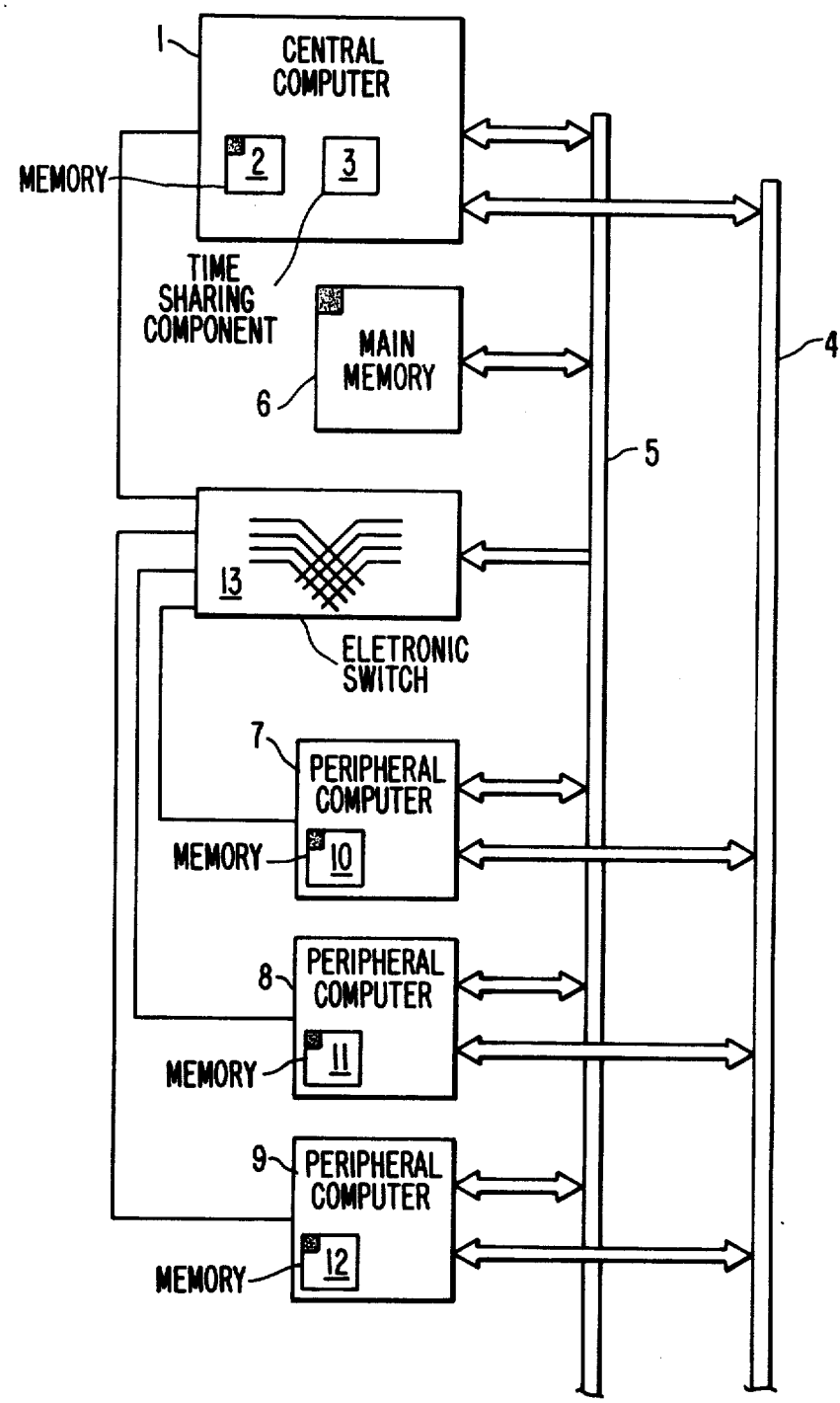
FIG. 1 is a schematic diagram of a computer network incorporating a rapid message transmission system in accordance with the invention in a preferred or best mode.

FIG. 1 illustrates diagrammatically a computer network adapted for rapid transmission of messages between computers in accordance with the invention. In the form shown, the network includes a central computer (1), three peripheral computers (7, 8, 9), and a main or common memory (6) all having connections to a bus (5), as shown. There is also provided, according to the invention, a request bus (4) to which all of the computers are connected, whereby requests from the peripheral computers to access the main memory (6) are transmitted to the central computer (1) for purposes which will become apparent hereinafter.

Central computer (1), which controls the illustrated system, includes its own local memory (2), as well as a time-sharing component (3) which regulates access to the main memory (6). Time-sharing component (3) is preferably of the type described in co-pending U.S.

patent application Ser. No. 581,813 filed Feb. 21, 1984 (incorporated herein by reference). Basically, components of this type include two principal elements—a scanning circuit, which scans the peripheral computers for requests to access the main memory, and a decision-making circuit, which monitors the occupancy status of the bus and grants requesting computers access to the bus for connection to the main memory when the bus is free. According to the exemplary time-sharing scheme disclosed in the aforementioned application, the central computer has priority access to the main memory and is normally connected to the bus. The peripheral computers (which are normally disconnected from the bus) are individually permitted to occupy the bus to access the main memory during periods when the central computer does not require the memory (and so may be disconnected from the bus) and the bus is not already occupied by another peripheral computer. In the illustrative embodiment of FIG. 1, the connections of the peripheral computers (7, 8, 9) to the time-sharing component (3) are via the request bus (4), while the central computer (1) is connected internally to the component. The reader is referred to the aforementioned co-pending application for further details.

With continued reference to FIG. 1, peripheral computers (7, 8, 9) include respective individual or local memories (10, 11, 12), as shown. While only three peripheral computers are indicated in the drawing, it is obvious that the number of peripheral computers may vary depending upon the requirements of particular applications. In practice, the individual memories (2, 10, 11, 12) of the network computers (1, 7, 8, 9) may have a capacity of 256,000 16-bit words, whereas the main memory (6) may suitably have a capacity of 512,000 16-bit words. It will be apparent to those skilled in the art that conventional computer, related memory and other components may be employed in the practice of the invention, and no further details of these components will be necessary herein for an understanding of the invention.

In accordance with the invention, in order to prevent messages to be transmitted between two computers from travelling through the bus (5) and the main memory (6), so that traffic along the bus (5) can be reduced and the transmission speed for messages increased, an electronic switch (13) is connected to each computer, as shown. Electronic switch (13) may, for example, be a time division type automatic telephone switch, such as the JISTEL 500 (available commercially from the assignee hereof) which is capable of switching sixty-four numerical connections at a speed of 2 megabits per second without lockouts. The control registers of the switch (13) are connected to data bus (5) so that the switch may be controlled by the central computer (1) over the bus in a conventional manner during access periods of the central computer to the bus. Switched connections are, of course, made to the respective network computers. Interfacing of the individual computers to the electronic switch (13) may be accomplished using conventional interface components, as will be described later.

Having described the basic configuration of the system of FIG. 1, the manner in which pairs of computers are linked for direct data transmission through switch (13) will now be explained. For the purposes of example, it will be assumed that the component (3) incorporates the earlier mentioned time-sharing scheme, whereby central computer (1) has priority access to the bus (5), with the respective peripheral computers (7, 8, 9) having access to the bus during intervals when the central computer does not require the main memory.

In accordance with the invention, the establishment of a connection between two computers is initiated by the issuance of a connection order for processing by central computer (1), the order being issued by a computer desiring to transmit information. Requests by the central computer to establish a link to another unit are processed internally of the central unit, which sends appropriate instructions over bus (5) to control switch (13) during a period when the central unit occupies the bus. In the case of peripheral computers (7, 8, 9), a computer first requests access to main memory (6) over request bus (4) and is granted access to the memory by time-sharing component (3) when bus (5) is free, as previously discussed. Upon receiving access to main memory (6), the requesting computer writes a connection order to the memory. The connection order may suitably consist of an identifier code corresponding to that particular order, the address of the requesting computer, and the address of the computer designated to receive data. Ordinarily, all of the network computers are programmed to receive data, so that when the desired connection is established through switch (13), the designated receiving computer will be in a data receiving mode. Once the connection order has been written into main memory (6), it is read by the central computer (1). The central computer may be programmed to execute connection orders in any desired manner. For example, connection orders may be executed chronologically subject to availability of the required computers, or a system of priorities may be utilized. In the latter case, connection orders may include a priority code, or the main computer may be programmed to establish priority in accordance with some predetermined scheme.

The central computer stores within its local memory the state of occupancy status of the various computers in the network. That is, it maintains a record of which computers it has caused to be connected to other units through the electronic switch (13). If the network status is such that a connection order may be executed (i.e., the desired connection established), central computer (1) writes instructions to the control registers of the electronic switch (13) over bus (5) to effect the required connection. The central computer then writes a report to the main memory, indicating that the connection order has been executed. If the requested link cannot be achieved, the central computer writes a report indicating that the order has not been executed and that the requesting computer must wait.

Next, the requesting computer again accesses the main memory in the manner previously described to read the report written by the central computer (1). If the report indicates that the connection order has been executed, the requesting computer is thus informed that the designated receiving computer has been connected through the switch for the exchange of data, whereupon data is transmitted from the requesting computer to the receiving computer. If, on the other hand, the report written into memory (6) indicates that the requested link has not been made, the requesting computer may continue to seek access to the main memory until an affirmative report is detected. If desired in a particular application, the requesting computer may be programmed to discontinue waiting for an affirmative report after a selected time and to attempt to establish the connection later, after additional operations have been completed.

It will be appreciated that by virtue of the switch (13), it is possible to avoid message transmission between network computers through main memory (6), the main memory being utilized primarily for the purpose of transmitting connection orders and related information (reports). Furthermore, because switch (13) can establish multiple direct links between the respective members of different pairs of computers simultaneously, a significant increase in message transmission speed is achieved.

Naturally since the bus (5) and the main memory (6) are relieved of their respective functions in terms of transferring messages, their resulting additional available capacity can be used for other functions.

Figure 2:
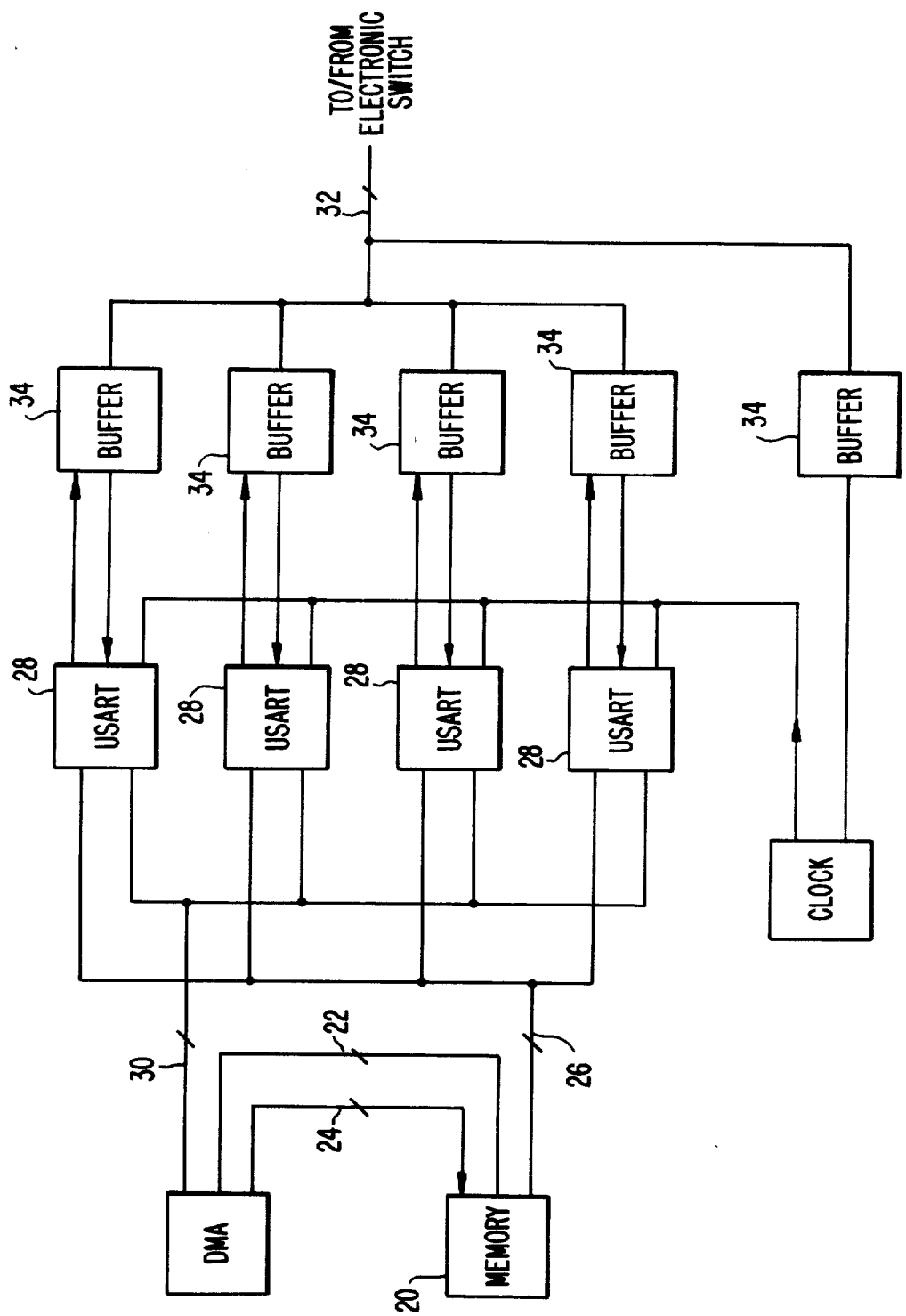
FIG. 2 is a schematic diagram of an interface circuit employed in the system of FIG. 1.

As noted previously, interfacing of the network computers to switch (13) can be achieved with conventional interface components. An exemplary interface for a single computer is shown diagrammatically in FIG. 2. The interface circuit shown includes a memory (20) for data to be transmitted to and received from other network computers. Memory (20) is controlled by a direct memory access circuit, designated DMA, such as the Advanced Micro Devices model 9517. Control of memory (20) by the DMA circuit is effected over a control bus (22) and an address bus (24) which are connected to the memory (20), as shown. Data is transmitted to and received by memory (20) over a data bus (26) which is connected to a group of four universal synchronous and asynchronous receiver transmitters or USARTs (28), as indicated. Each USART may, for example, be an Advanced Micro Devices model 8530 which includes two data registers—one of which functions during the data transmission mode to transmit data from memory (20) to another network computer, the other of which functions during the data receiving mode to receive data from another network computer for entry into memory (20). The USARTs are connected to the DMA circuit by a control bus (30), as shown, and are synchronized by connection to a common clock (so designated) which is also connected to the USARTs of the remaining network computer interface circuits and to the switch (13), so as to synchronize information transmission throughout the network.

USARTs (28) transmit and receive data through the electronic switch (13) over a bus (32) via corresponding buffer units (34) which are standard RS 422 type buffers, such as Advanced Micro Devices models 26LS 31 and 26LS 32. When the associated computer is in the data transmission mode, USARTs (28) transmit data read from memory (20) via the corresponding buffers and bus (5) to switch (13). Conversely, when the associated computer is operating in the data receiving mode, the USARTs receive data over bus (5) via the corresponding buffers (34), and the data is written into memory (20) over bus (26). It will be appreciated by those skilled in the art that with a typical USART having a data transmission rate of about 2 megabits per second, an interface circuit incorporating 4 USARTs, as shown, will provide an effective data transmission rate of 8 megabits per second.

While the operation of the interface circuitry just described will be apparent to those skilled in the art, a general description will now be given for convenience of the reader. The basic sequence of operation of the interface circuit in the data transmission mode is as follows. First, USARTs (28) send read control signals to the DMA circuit via control bus (30). The DMA circuit then sends a reading control signal to memory (20) over control bus (22) and address signals over address bus (24), the address signals indicating the addresses in memory (20) of the data to be transmitted by corresponding USARTs over bus (32) The DMA circuit next sends writing control signals to the USARTs over control bus (30). Upon receipt of the writing control signals, the USARTs read data from the corresponding addresses in memory (20) over bus (26) and write the data into their respective transmission registers. The data is then transferred to the associated buffers (34) for transmittal over bus (32).

When the interface operates to receive data (the computers being normally programmed for the receiving mode), USARTs (28) send writing control signals to the DMA circuit via control bus (30). The DMA circuit sends memory (20) a writing control signal via control bus (22) and address signals over address bus (24), the latter signals designating the addresses in the memory at which the data received by the USARTs is to be written. The DMA circuit sends a reading control signal to the USARTs over control bus (30), and the USARTs read data over bus (32) into their respective receiving registers, from which the data is written over bus (26) into memory (20) at the designated addresses.

In a typical network of the type under consideration, without the benefit of the invention, 3.5 microseconds may normally be necessary for transferring a 16-bit word from a computer to the main memory, with another 3.5 microseconds being necessary for transferring the same word from the main memory to another computer. Inasmuch as the main computer (1) ordinarily requires the bus (5) half of the time, the total required time for transferring a word from one computer to another is 14 microseconds. With the network adapted for rapid message transmission in accordance with the present invention, transferring of words can be completed in only 2 microseconds, or seven times more rapidly. Furthermore, waiting time is substantially reduced, because several links can be maintained simultaneously by the electronic switch.

Although only one preferred application of the invention has been described, it is obvious that modifications may be introduced within the scope of the invention as defined in the appended claims. For example, a space division type switch may be employed rather than a time division switch to effect the various connections between the network computers.

We claim:

1. A computer network including a central computer, a plurality of peripheral computers, a common memory accessible by said central computer and said peripheral computers over a single bus connected to said common memory, time-sharing means connected to said central computer and said peripheral computers for regulating access to said common memory by said central computer and said peripheral computers, and electronic switch means having switchable connections to the respective central and peripheral computers and having control means connected to said bus for receiving control signals from said central computer, whereby direct connections between respective members of one or more selected pairs of computers may be effected through said electronic switch means so that the respective members of each of said pairs of computers may communicate directly through said switch means.

2. A computer network as claimed in claim 1, wherein said electronic switch means comprises a switch of the telephone line type.

3. A computer network as claimed in claim 2, wherein said switch is of the time division type.

4. A computer network as claimed in claim 1, wherein said central computer is normally connected to said bus and said peripheral computers are connectable individually to said bus during periods when said central computer is not connected to said bus.

5. In a computer network including a central computer, a plurality of peripheral computers, a common memory accessible by said central computer and said peripheral computers over a single bus connected to said common memory, time-sharing means connected to said central computer and said peripheral computers for regulating access to said common memory by said central computer and said peripheral computers, and electronic switch means having switchable connections to the respective central and peripheral computers and having control means connected to said bus for receiving control signals from said central computer, a method for direct transmission of information from one computer to another, comprising the steps of granting access of said one computer to said common memory, writing a connection order from said one computer to said common memory, said connection order identifying said one computer and said another computer to which said information is to be transmitted, reading said connection order from said common memory to said central computer, and issuing a control signal from said central computer to said electronic switch means over said bus for causing said switch means to connect said another computer to said one computer, whereby said information may be transmitted directly from said one computer to said another computer through said switch means.

* * * * *